United States Patent
Steinberg et al.

(10) Patent No.: US 7,685,341 B2
(45) Date of Patent: *Mar. 23, 2010

(54) REMOTE CONTROL APPARATUS FOR CONSUMER ELECTRONIC APPLIANCES

(75) Inventors: Eran Steinberg, San Francisco, CA (US); Sumat Mehra, Kanpur (IN); Petronel Bigioi, Galway (IE)

(73) Assignee: FotoNation vision Limited, Galway (IE)

( * ) Notice: Subject to any disclaimer, the term of this patent is extended or adjusted under 35 U.S.C. 154(b) by 342 days.

This patent is subject to a terminal disclaimer.

(21) Appl. No.: 11/123,972

(22) Filed: May 6, 2005

(65) Prior Publication Data

US 2006/0282572 A1    Dec. 14, 2006

(51) Int. Cl.
*H04N 5/222*    (2006.01)
(52) U.S. Cl. .................... 710/72; 710/2; 710/8
(58) Field of Classification Search .............. 710/10, 710/303; 345/156, 419; 386/125, 52, 68, 386/70
See application file for complete search history.

(56) References Cited

U.S. PATENT DOCUMENTS

| | | | |
|---|---|---|---|
| 5,500,700 | A | 3/1996 | Massarsky |
| 5,555,376 | A | 9/1996 | Theimer et al. |
| 5,602,997 | A | 2/1997 | Carpenter et al. |
| 5,727,135 | A | 3/1998 | Webb et al. |
| 5,774,172 | A * | 6/1998 | Kapell et al. ............. 725/139 |
| 5,812,865 | A | 9/1998 | Theimer et al. |
| 5,886,732 | A | 3/1999 | Humpleman |
| 5,905,521 | A * | 5/1999 | Gatto et al. ............. 725/95 |
| 6,182,094 | B1 | 1/2001 | Humpleman et al. |
| 6,184,998 | B1 | 2/2001 | Tebeka |
| 6,211,870 | B1 * | 4/2001 | Foster ............. 715/744 |
| 6,275,144 | B1 | 8/2001 | Rumbaugh |
| 6,496,122 | B2 * | 12/2002 | Sampsell ............. 340/825.69 |
| 6,591,069 | B2 | 7/2003 | Horiguchi |
| 6,633,281 | B2 * | 10/2003 | Lin et al. ............. 345/173 |
| 6,690,357 | B1 | 2/2004 | Dunton et al. |
| 6,697,090 | B1 | 2/2004 | Nagasaka et al. |

(Continued)

FOREIGN PATENT DOCUMENTS

JP    2009-500880 T    1/2009

(Continued)

OTHER PUBLICATIONS

Dell, "Owner's Manual- Dell Inspiron 1100", Jul. 2003.*

(Continued)

*Primary Examiner*—Henry W. H. Tsai
*Assistant Examiner*—Cheng-Yuan Tseng
(74) *Attorney, Agent, or Firm*—Andrew V. Smith

(57) ABSTRACT

An apparatus for the remote wireless control of a consumer electronic audio visual appliance such as a TV set, and/or for internet uploading, includes a remote control handset and a wireless receiver for connection to the appliance. The remote control unit is adapted to transmit audio and/or visual data (A/V data) and control codes to the receiver. The receiver is responsive to the A/V data and control codes to control the appliance to play and/or display the A/V data. The remote control unit includes a reader for a storage medium for A/V data, or a cable or wireless interface to an A/V acquisition device such as digital video or digital still camera or digital music player or recorder.

69 Claims, 8 Drawing Sheets

U.S. PATENT DOCUMENTS

| | | |
|---|---|---|
| 6,725,281 B1 | 4/2004 | Zintel et al. |
| 6,750,902 B1 | 6/2004 | Steinberg et al. |
| 6,779,004 B1 | 8/2004 | Zintel |
| 6,798,459 B1* | 9/2004 | Izumi ........................ 348/552 |
| 6,810,409 B1 | 10/2004 | Fry et al. |
| 6,822,698 B2* | 11/2004 | Clapper ...................... 348/734 |
| 6,894,686 B2* | 5/2005 | Stamper et al. ............. 345/419 |
| 7,023,498 B2* | 4/2006 | Ishihara ...................... 348/734 |
| 7,039,727 B2 | 5/2006 | Camara et al. |
| 7,092,022 B1 | 8/2006 | Brake |
| 7,115,032 B2* | 10/2006 | Cantu et al. ..................... 463/9 |
| 7,128,420 B2 | 10/2006 | Kapellner et al. |
| 7,199,909 B2* | 4/2007 | Han et al. .................... 358/474 |
| 7,315,631 B1 | 1/2008 | Corcoran et al. |
| 7,340,214 B1 | 3/2008 | Hamberg |
| 7,380,260 B1* | 5/2008 | Billmaier et al. .............. 725/37 |
| 7,432,990 B2* | 10/2008 | Borden et al. ............... 348/734 |
| 7,457,966 B2* | 11/2008 | Shinada ...................... 713/185 |
| 7,469,071 B2 | 12/2008 | Drimbarean et al. |
| 7,496,278 B2* | 2/2009 | Miyamoto et al. ............ 386/95 |
| 7,506,057 B2 | 3/2009 | Bigioi et al. |
| 7,519,686 B2* | 4/2009 | Hong et al. ................. 709/219 |
| 7,564,994 B1 | 7/2009 | Steinberg et al. |
| 7,581,182 B1* | 8/2009 | Herz .......................... 715/713 |
| 2002/0038372 A1 | 3/2002 | Idehara et al. |
| 2002/0043557 A1 | 4/2002 | Mizoguchi et al. |
| 2002/0084909 A1 | 7/2002 | Stefanik et al. |
| 2002/0120944 A1 | 8/2002 | Wasilewski |
| 2003/0160890 A1 | 8/2003 | Caspe et al. |
| 2003/0163542 A1 | 8/2003 | Bulthuis et al. |
| 2004/0090461 A1* | 5/2004 | Adams ....................... 345/765 |
| 2004/0100486 A1* | 5/2004 | Flamini et al. .............. 345/723 |
| 2004/0146057 A1 | 7/2004 | Yi et al. |
| 2004/0155791 A1* | 8/2004 | Nguyen et al. ......... 340/825.69 |
| 2004/0175040 A1 | 9/2004 | Rizzotti et al. |
| 2004/0205220 A1 | 10/2004 | Nakamura et al. |
| 2004/0221044 A1 | 11/2004 | Rosenbloom et al. |
| 2004/0223060 A1 | 11/2004 | Yasuda |
| 2004/0223747 A1* | 11/2004 | Otala et al. ................. 386/125 |
| 2004/0224638 A1 | 11/2004 | Fadell et al. |
| 2005/0041121 A1 | 2/2005 | Steinberg et al. |
| 2005/0055716 A1* | 3/2005 | Louie et al. ................... 725/58 |
| 2005/0068447 A1 | 3/2005 | Steinberg et al. |
| 2005/0068452 A1 | 3/2005 | Steinberg et al. |
| 2005/0140801 A1 | 6/2005 | Prilutsky et al. |
| 2005/0219241 A1 | 10/2005 | Chun |
| 2005/0251754 A1* | 11/2005 | Padgett et al. ............... 715/779 |
| 2006/0007306 A1* | 1/2006 | Masters et al. .............. 348/114 |
| 2006/0018025 A1 | 1/2006 | Sharon et al. |
| 2006/0022895 A1* | 2/2006 | Williams et al. ............. 345/2.1 |
| 2006/0025092 A1* | 2/2006 | Sanders et al. ........... 455/161.1 |
| 2006/0048194 A1* | 3/2006 | Poslinski ...................... 725/81 |
| 2006/0098890 A1 | 5/2006 | Steinberg et al. |
| 2006/0120599 A1 | 6/2006 | Steinberg et al. |
| 2006/0140455 A1 | 6/2006 | Costache et al. |
| 2006/0149811 A1 | 7/2006 | Bennett et al. |
| 2006/0204055 A1 | 9/2006 | Steinberg et al. |
| 2006/0204110 A1 | 9/2006 | Steinberg et al. |
| 2006/0279662 A1 | 12/2006 | Kapellner et al. |
| 2006/0282551 A1 | 12/2006 | Steinberg et al. |
| 2006/0282572 A1 | 12/2006 | Steinberg et al. |
| 2006/0284982 A1 | 12/2006 | Bigioi et al. |
| 2006/0285754 A1 | 12/2006 | Steinberg et al. |
| 2006/0288071 A1 | 12/2006 | Bigioi et al. |
| 2007/0047043 A1 | 3/2007 | Kapellner et al. |
| 2007/0094703 A1* | 4/2007 | Nygaard et al. ............. 725/135 |
| 2007/0110305 A1 | 5/2007 | Corcoran et al. |
| 2007/0116380 A1 | 5/2007 | Ciuc et al. |
| 2007/0147820 A1 | 6/2007 | Steinberg et al. |
| 2007/0189748 A1 | 8/2007 | Drimbarean et al. |
| 2007/0201725 A1 | 8/2007 | Steinberg et al. |
| 2007/0263104 A1 | 11/2007 | DeLuca et al. |
| 2007/0269108 A1 | 11/2007 | Steinberg et al. |
| 2007/0296833 A1 | 12/2007 | Corcoran et al. |
| 2008/0013799 A1 | 1/2008 | Steinberg et al. |
| 2008/0240555 A1 | 10/2008 | Nanu et al. |
| 2008/0250239 A1 | 10/2008 | Risan et al. |
| 2008/0292193 A1 | 11/2008 | Bigioi et al. |
| 2009/0115915 A1 | 5/2009 | Steinberg et al. |

FOREIGN PATENT DOCUMENTS

| | | |
|---|---|---|
| WO | WO-06133764 A2 | 12/2006 |
| WO | WO-06133764 A3 | 12/2006 |
| WO | WO-2008021945 A2 | 2/2008 |

OTHER PUBLICATIONS

Interact-TV, "Telly: The Home Entertainment Sewer", Jun. 22, 2004, "http://web.archive.org/web/20040622083339/interact-tv.com/products.php".*

Toshiba, libretto U100, Apr. 22, 2005, Toshiba America Information Systems Inc., Rev. 1.02.*

Microsoft, Computer Dictionary, 1997, Microsoft Press, Third Edition, p. 225.*

CIPA, Digital Photo Solutions for Imaging Devices, 2003, CIPA, pp. 1-6.*

Bigioi, P.; Susanu, G.; Corcoran, P.; Mocanu, I, "Digital camera connectivity solutions using the picture transfer protocol (PTP)" IEEE Transactions on Consumer Electronics, Aug. 2002, vol. 48, Issue 3, pp. 417-427.

Canon, "Powershot G1, Camera User Guide" and "Software Starter Guide", 2000.

CIPA DC-001-2003: Digital Photo Solutions for Imaging Devices, Published by Camera & Imaging Products Association, PictBridge Standard of Camera & Imaging Products Association, Feb. 3, 2003, http://www.cipa.jp/pictbridge/contents_e/03overview_e.html.

International Search Report and the Written Opinion of the International Searching Authority for PCT Application No. PCT/EP2006/004006, dated Jun. 26, 2006, 8 pages.

Digital-Album by Nixvue Systems Ltd. (www.nixvue.com).

Media Transfer Protocol Specification, msdn.microsoft.com/library/default.asp?url=/library/enus/dnwmt/html/mtp_spec.asp.

Media Transfer Protocol Enhanced, Revision 0.83.

Patent Abstract of Japan, vol. 1, 1998, No. 11, Sep. 30, 1998 & JP 10-174009 A, Jun. 26, 1998.

PIMA 15740:2000: Photography—Electronic Still Picture Imaging—Picture Transfer Protocol (PTP) for Digital Still Photography Devices, Photographic and Imaging Manufacturings Association, Approved Jul. 5, 2000, First Edition.

CIPA DC-005-2005: "Picture Transfer Protocol" over TCP/IP Networks, Published by Camera & Imaging Products Association, CIPA Standard of the Camera & Imaging Products Association, Nov. 8, 2005, http://www.cipa.jp/ptp-ip/documents_e/CIPA_DC-005_Whitepaper_Eng.pdf.

Research-lab, "Better Wave to Text", Dec. 30, 2004, "http://www.research-lab.com/vexp007read.htm".

The PrismIQ Media Adapter (www.prismiq.com).

UPNP Forum http://www.upnp.org.

UPnP Standards, Internet printout Jan. 1, 2007, http://www.upnp.org/standardizeddcps/default.asp, 1 page.

USB Device Working Group, "USB Still Image Capture Device Definition", Revision 1.0, Jul. 11, 2000, http://www.usb.org/developers/devclass_docs/usb_still_img10.pdf.

ISO 15740 Enables Seamless Image Transfer Between Devices, Sep. 26, 2005, 3 pages, http://www.i3a.org/pr_09_26_05.html.

PTP: enabling seamless image transfer between devices. Overview of ISO 15740: 2005—Picture Transfer Protocol (PTP), http://www.i3a.org/pdf/i3a_ptp_factsheet.pdf.

Bigioi, P. et al., "PTP/IP a new transport specification for wireless photography", IEEE Transactions on Consumer Electronics, 2005, vol. 51.

Corcoran, P.M. et al., "Internet enabled digital photography", IEEE Transactions on consumer Electronics, 1999, pp. 577-583, vol. 45.

Corcoran, P.M. et al., "Wireless transfer of images from a digital camera to the internet via a standard GSM mobile phone", IEEE Transactions on Consumer Electronics, 2001, pp. 542-547, vol. 47.

Examination Report for European Patent Application No. 06742746.8, dated Mar. 6, 2008, 5 Pages.

Final Office Action mailed Feb. 8, 2008, for U.S. Appl. No. 11/123,961, filed May 6, 2005.

Final Office Action mailed Feb. 20, 2008, for U.S. Appl. No. 11/156,235, filed Jun. 17, 2005.

Final Office Action mailed Jan. 7, 2009, for U.S. Appl. No. 11/156,235, filed Jun. 17, 2005.

Fotonation Inc.: "PTP over IP The state of development" Internet, Sep. 2004, XP002390455 Retrieved from the Internet: URL: http://www.i3a.org/pdf/PTPIP_Technical_Overview_Oct2004.pdf.

Hewlett Packard, hp psc 2500 photosmart series all-in-one, 2003, HP pp. 6-8, 29, 141 & 142.

Nikon Report: "Das Nikon Neuigkeiten-Archiv"News-Archiv, Feb. 2005 XP002390456 internet.

Nikon Wireless Transmitter "WT-2", User's Manual—55 pages.

Non-Final Office Action mailed Apr. 29, 2009, for U.S. Appl. No. 11/156,235, filed Jun. 17, 2005.

Non-Final Office Action mailed Aug. 21, 2007, for U.S. Appl. No. 11/123,961, filed May 6, 2005.

Non-Final Office Action mailed Jul. 9, 2008, for U.S. Appl. No. 11/123,961, filed May 6, 2005.

Non-Final Office Action mailed Jul. 23, 2008, for U.S. Appl. No. 11/156,235, filed Jun. 17, 2005.

Non-Final Office Action mailed May 20, 2009, for U.S. Appl. No. 11/123,961, filed May 6, 2005.

Non-Final Office Action mailed Oct. 3, 2007, for U.S. Appl. No. 11/156,235, filed Jun. 17, 2005.

PCT International Preliminary Report on Patentability for PCT Application No. PCT/EP2006/003999, dated Dec. 17, 2007, 13 pages.

PCT Invitation to Pay Additional Fees for PCT Application No. PCT/EP2006/003999, dated Oct. 10, 2006, 5 pages.

PCT Notification of Transmittal of the International Search Report and the Written Opinion of the International Searching Authority, or the Declaration for PCT Application No. PCT/EP2006/003999, dated Jan. 30, 2007, 19 pages.

PCT Notification of Transmittal of the International Search Report and the Written Opinion of the International Searching Authority, or the Declaration for PCT Application No. PCT/US2007/075564, dated Jan. 30, 2008, 11 pages.

White Paper of CIPA DC-005-2005, "'Picture Transfer Protocol' over TCP/IP networks", Standard of the Camera & Imaging Products Association, published by Camera & Imaging Products Association, Nov. 8, 2005, 6 pages.

* cited by examiner

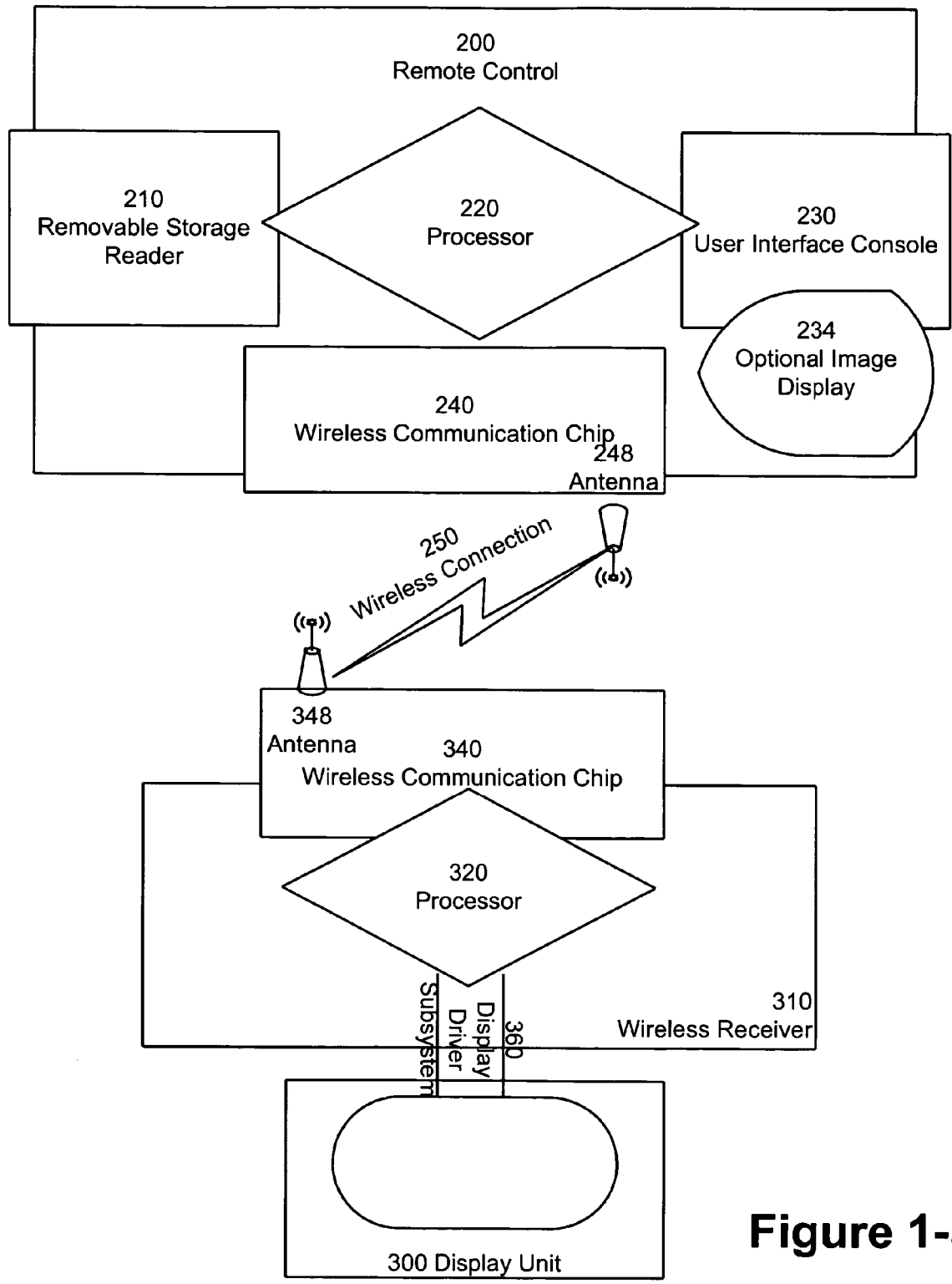
Figure 1-a

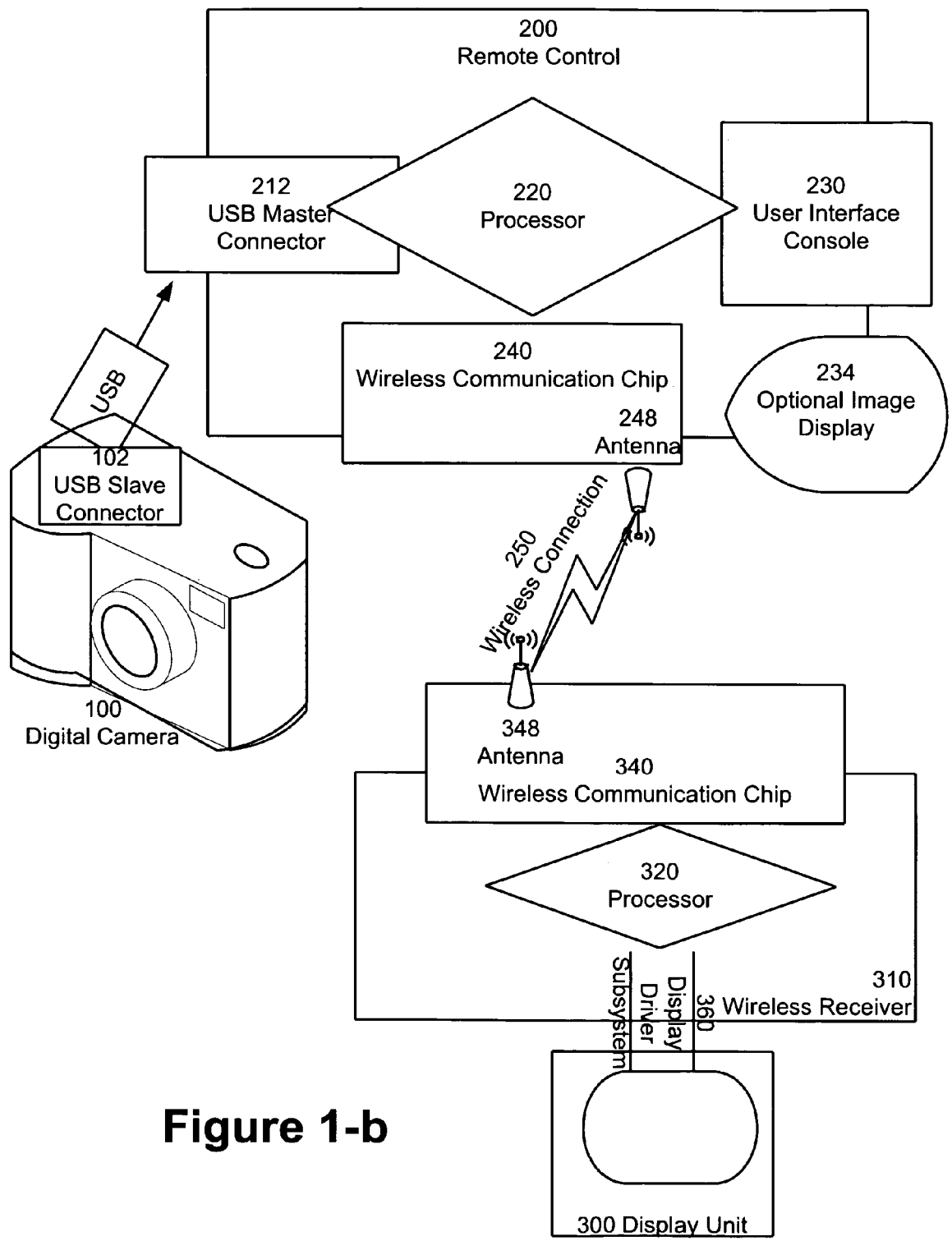
Figure 1-b

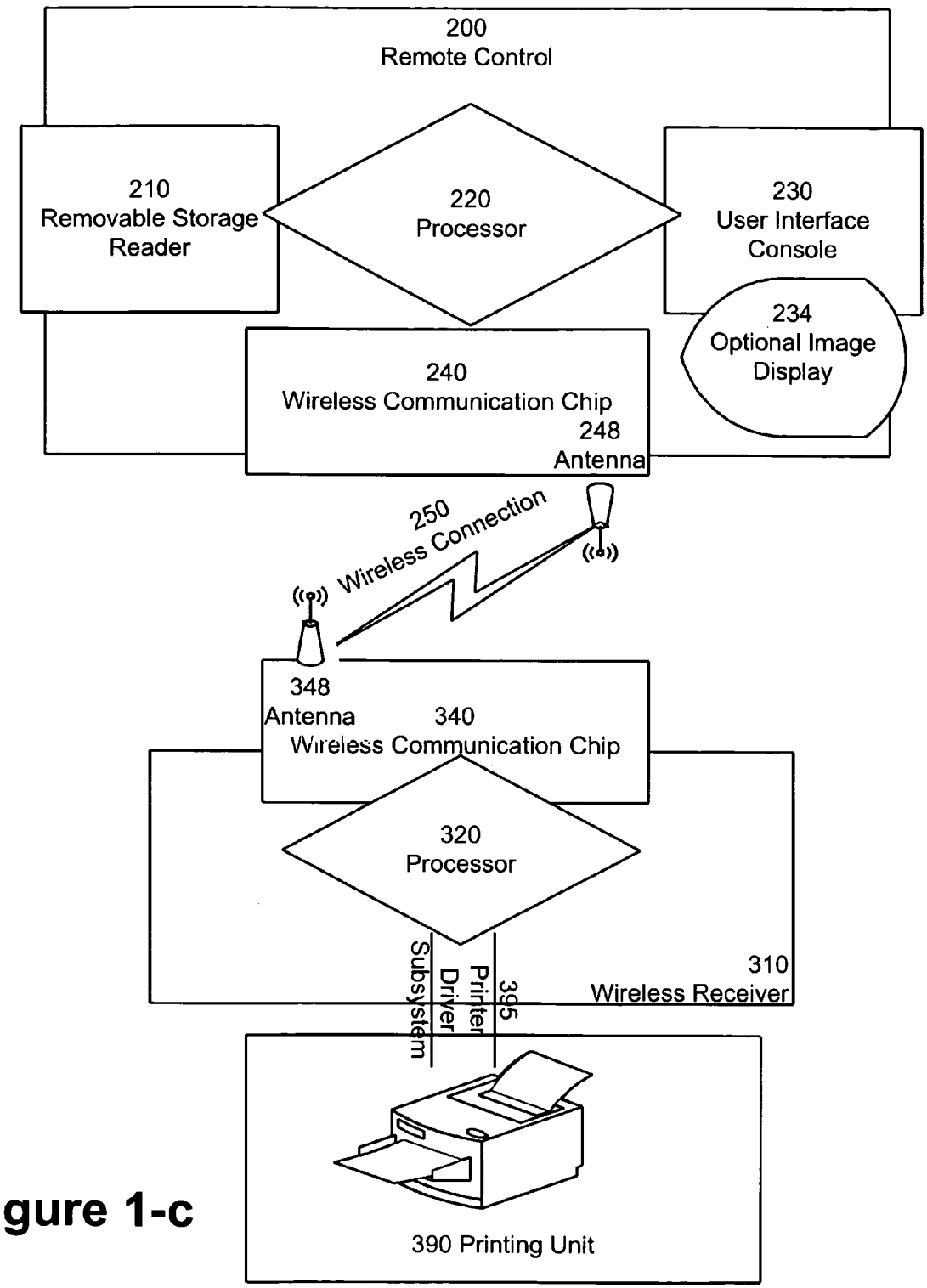
Figure 1-c

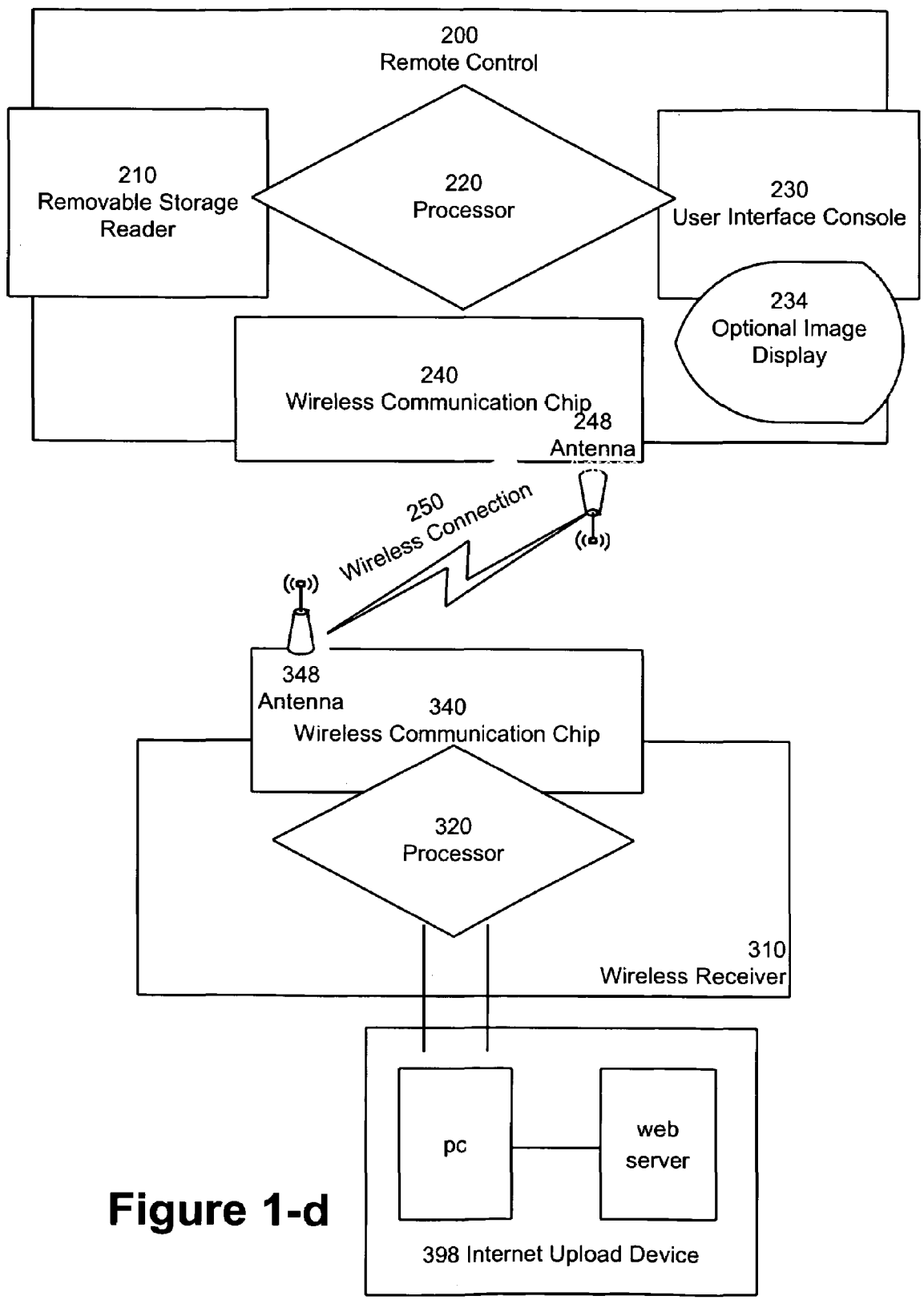
Figure 1-d

REMOTE CONTROL APPARATUS FOR CONSUMER ELECTRONIC APPLIANCES

CROSS-REFERENCE TO RELATED APPLICATIONS

This application is related to U.S. patent application Ser. No. 11/123,961, filed May 6, 2005, entitled "Remote Control Apparatus for Printer Appliances", and to PCT Application No. PCT/EP2006/004006, filed Apr. 28, 2006, entitled "Remote Control Apparatus for Consumer Electronic Appliances", both of which are hereby incorporated by reference.

BACKGROUND

1. Field of the Invention

The invention relates to a wireless remote control apparatus for consumer electronic (CE) appliances, and to systems and methods for transferring and controlling audio and/or visual data (hereinafter "A/V data) from acquisition devices, through a wireless remote control apparatus, and onto an output display devices.

2. Description of the Related Art

Traditionally, domestic homes have contained stand-alone CE appliances such as TV sets or single add-on appliances such as VCR and DVD players which allow the recording of TV shows and playing of pre-recorded movies. However, the last few years have seen a substantial growth in audio and visual content derived from digital appliances and made available to consumers in digital form. Examples include digital cameras for digital imaging and MP3 digital encoding for audio data, as well as digital video cameras. Broadly speaking most consumers now find digital content more flexible and useful than conventional analog media. However, although most digital content can be readily managed and post-processed on a conventional desktop computer, this is not necessarily the best location for a consumer to enjoy such content.

Accordingly a new generation of peripheral add-on CE appliances have emerged, such as Picture Display Devices and Media Adapters, whose goal is to enable the viewing of digital content using more conventional CE appliances such as a TV set. A Media Adapter is an appliance which can receive digital content over a network connection and convert it to standard RCA, S-Video, HDTV or DV output for presentation on a standard TV set. Typically such an appliance sources its content from a networked desktop computer.

The PrismIQ Media Adapter (www.prismiq.com) is a good state-of-art example of such an appliance. It allows audio, video and still photo content located on a networked home computer to be viewed on a home TV-set. The PrismIQ features audio and video outputs which allow it to be connected directly to a standard TV set. It may be networked with the home computer via either wired, or wireless network connections. The main PrismIQ appliance can then be managed by the user with a conventional remote control unit, thus allowing the display of digital content on the TV set from a couch in the living room. Even with the PrismIQ, however, digital content is first loaded onto a desktop computer and pre-processed by a specialized server application prior to being accessible by the user from the comfort of his living room.

Picture Display Devices such as Digital-Album by Nixvue Systems Ltd. (www.nixvue.com), generally include a "set-top box" which plugs physically into a television set and contains one or more readers for a removable storage medium, such as a memory card, containing audio and/or visual data content. Operating picture display devices, however, involves users plugging the removable storage medium into the box, returning to their seats and activating then remote control unit. This becomes awkward if users have multiple removable memory cards that they wish to review or organize. That is, operating picture display devices involves users moving from the couch to the TV set or box in order to switch removable memory cards.

SUMMARY OF THE INVENTION

An apparatus is provided, in accordance with one aspect of the invention, for remote wireless control of a consumer electronic (CE) appliance and/or of internet uploading. The apparatus for CE control includes a remote control unit and a wireless receiver for direct or indirect connection to the CE appliance. The remote control unit is adapted to transmit audio and/or visual data (hereinafter "A/V data"; visual data including video or still image data, or both) and control codes to the receiver. The receiver is responsive to the A/V data and control codes from the remote control unit to control the appliance to play and/or display the A/V data.

Preferably, the same remote control unit may also be adapted to directly control the consumer electronic appliance.

The remote control unit preferably includes a reader for a removable storage medium for A/V data. The A/V data transmitted to the receiver is read from the storage medium. Alternatively, the remote control unit may include a cable or wireless interface for signal connecting to an A/V acquisition device, such as a digital still camera, digital video camera or digital audio player, e.g., using an industry accepted interface.

In one embodiment a remote control handset and a memory card reader subsystem are combined into an integrated appliance. In another embodiment, a remote control handset and an interface to a digital media acquisition device are combined into another integrated appliance. These integrated appliances allow digital media, particularly digital images, to be accessed directly by a consumer from a removable memory card, or an acquisition device, and to be subsequently transmitted over a wireless link for direct display on a TV set or other digital display appliance. This has the advantageous of eliminating the need for the user to move from the couch to the TV set just to switch removable memory cards.

The apparatus for control of an internet uploading device (e.g., a pc computer connected to a web server) includes a remote control unit and a wireless receiver for direct or indirect control of an internet uploading device. The remote control unit is adapted to transmit internet content and control codes to the receiver. The receiver is responsive to the content and control codes from the remote control unit to control the uploading of the internet content, e.g., to a web page or database. Other features described with respect to the CE appliance control apparatus may be utilized in the internet upload apparatus.

A method for the remote wireless control of a consumer electronic (CE) appliance is also provided. A/V data is received from an A/V acquisition device at an interface of a remove control unit. The A/V data and control codes are transmitted to a wireless receiver coupled to a CE appliance. The receiver is configured to be responsive to the data and control codes received from the remote control unit to control the CE appliance to play and/or display or otherwise output the A/V data. Other features described with respect to the CE appliance and internet upload control apparatuses may be utilized with the method.

BRIEF DESCRIPTION OF THE DRAWINGS

Preferred and alternative embodiments are described below by way of example with reference to the accompanying drawings, in which:

FIG. 1-a is a block diagram of an embodiment including a removal storage medium reader wherein the output device is a display device such as a television set.

FIG. 1-b is a block diagram of an embodiment including a cable-based USB interface to the acquisition device.

FIG. 1-c is a block diagram of an embodiment wherein the output device is a printer.

FIG. 1-d is a block diagram of an embodiment wherein the output device is an Internet upload device.

DETAILED DESCRIPTION OF PREFERRED EMBODIMENTS

Figure 2:
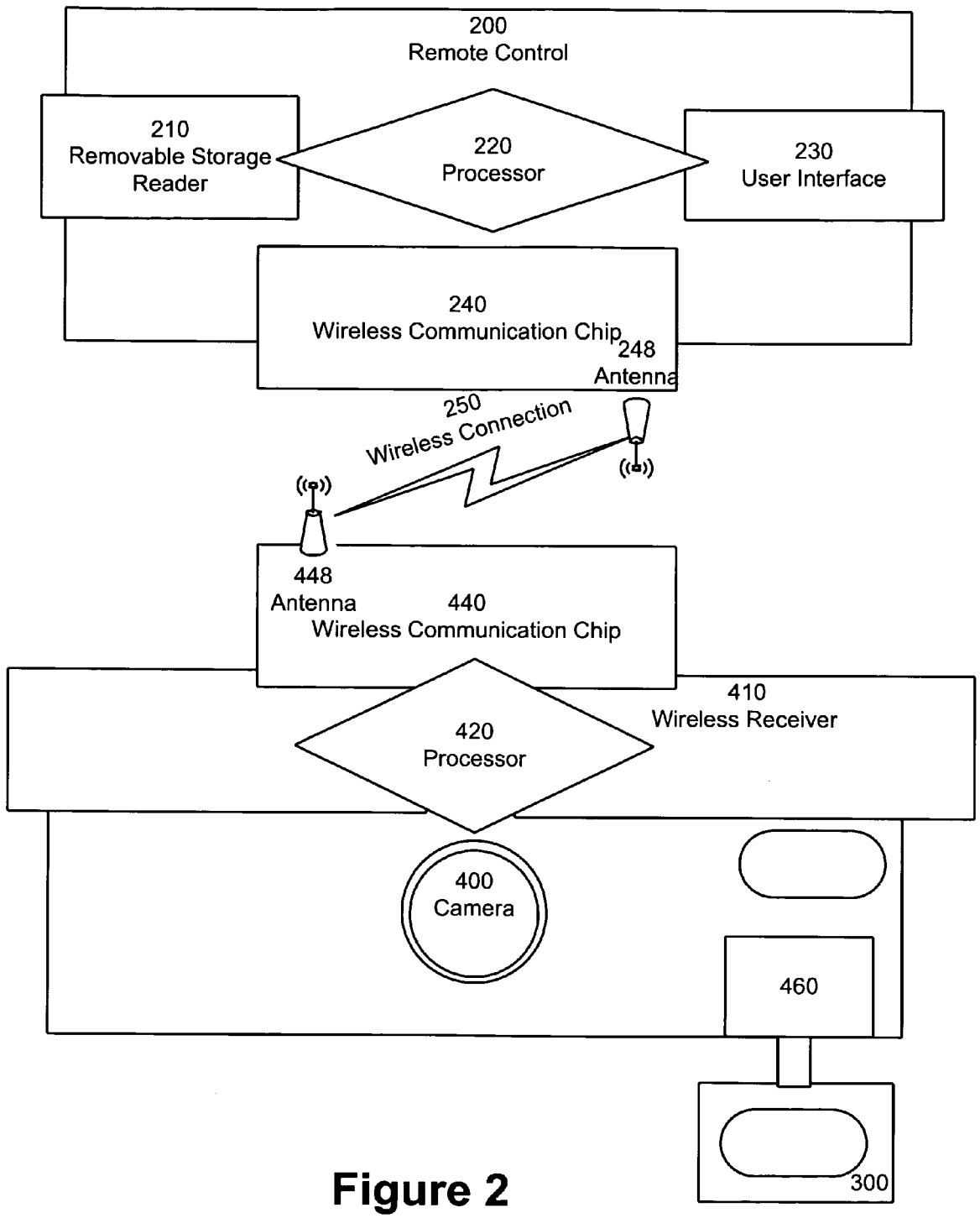
FIG. 2 is a block diagram of a further embodiment including a remote control signal connecting wirelessly with a digital camera.

FIG. 1-a is a block diagram of a system in accordance with a preferred embodiment. Referring to FIG. 1-a, the system includes a remote control unit 200, which may preferably be implemented as a handset, the embodiment illustrated at FIG. 4, and/or a docking station. The remote control unit 200 of FIG. 1-a is shown communicatively coupled with a wireless receiver 310. The remote control unit 200 comprises a main processor 220. The main processor is preferably an embedded processor such as a dedicated system-on-chip integrated circuit, for example, a standard ARM or MIPS based embedded system. The processor 220 shown in FIG. 1-a is interfaced to a number of peripheral subsystems commonly found in consumer remote control units: a user interface console 230 and a wireless communications chip 240. The user interface console 230 is, for example, a keyboard subsystem allowing the user to select and initiate various control functions by initiating the wireless transfer of control codes to a remote CE appliance such as a TV set or other display unit 300.

FIG. 1-c illustrates another embodiment wherein, instead of a display unit 300 such as a television set or other electronic audio and/or visual display device, the display unit 300 of FIGS. 1-a and 1-b is replaced by a hardcopy device such as a color printer 390. In the embodiment of FIG. 1-c, a printer driver 395 is also used instead of the display driver subsystem 360 shown in FIGS. 1-a and 1-b.

Another embodiment is illustrated at FIG. 1-d, wherein the data is internet content that may be communicated to an internet upload device 398, such as a pc or other processor-based device that is connected to a web server. The content may be uploaded to a web page or a database or other construct that is accessible via the internet.

Many remote control units 200 also feature an optional image display 234, for example, a LCD display. The display 234 may be an uncomplicated alphanumeric display, or may be a more sophisticated graphical color LCD display or any other display device known to those skilled in the art. A wireless communication chip 240 is preferably employed to communicate control codes (instructions) to the remote CE appliance 300, 390. An infrared based means of transmitting control codes may be employed, or alternative communication means such as Bluetooth or WiFi, WUSB or WLAN may be used. Such Radio Frequency communications may use an antenna 248. These and other subsystems may be used including those that may be common to domestic remote control units for direct control of a CE appliance 300, e.g., those that bypass wireless receiver 310.

The remote control unit 200 preferably also incorporates a removable storage medium reader 210, for example, a card reader subsystem for accessing data from removable storage media such as compact flash data cards. Alternatively, as illustrated at FIG. 1-b, the remote control unit 200 may have a cable or wireless signal communication interface to an A/V device. As utilized herein, the term "interface" is meant to be any architecture for permitting communication of the A/V data from the A/V device to the remote control unit 200 including a card reader 210, USB or other cable interface 212, or wireless interface. A digital camera 100 may communicate A/V data to the remote control unit 200 through a common cable communication system, such as may be installed on many standardized A/V devices. Such communication system may be a USB master 212 which interfaces with the device 100 through a USB slave connector 102, or a proprietary interface such as ImageLink. Interfacing with such A/V devices may be made using known protocols such as ISO-15740 command language for cameras also known as Picture-transfer-Protocol or PTP. In this scenario, the remote control unit 200 can also act as a docking station for the A/V device 100.

A system in accordance with a preferred embodiment has the advantage that digital audio and/or visual (A/V) content data may be accessed by the remote control unit 200 from removable storage media in the reader 210 or via a cable or wireless interface from the device 100. Moreover, such data, stored in internal storage (not shown) in the device 100, may be further managed, manipulated, combined and otherwise processed by the processor 220 on the remote control unit 200. After this data has been accessed and suitably prepared, it may be transmitted to the remote wireless receiver 310 along with a sequence of control codes instructing the receiver 310 as to the handling and playing/displaying of the data.

The wireless receiver 310 of FIGS. 1-a and 1-b includes a main processor 320, preferably an embedded processor, typically a dedicated system-on-chip integrated circuit. This processor 320 is connected to two main peripheral subsystems: a wireless communication chip 340 with antenna 348 and a display driver subsystem 360, for example, an RGB/NTSC/PAL/D1/VGA/HDTV/D1-4 interface which is connected, in turn, to a CE display unit such as a conventional TV set 300. The wireless communication chip 340 is employed to receive, via the wireless connection 250, control codes transmitted from the remote control unit 200 and, in addition, A/V data which is read from the removable storage medium inserted into the remote control unit 200.

The protocol used on the wireless connection 250 may be generic or a specific protocol for the imaging devices used. Examples include using similar protocol between image acquisition devices and hosts such as PTP or in the wireless case PTP-IP or MTP over IP ("MTP-IP"). In the embodiment illustrated at FIG. 1-c, wherein the output device is a printer 390, such protocols as PictBridge may be used to transfer the data over wireless connection 250. The CE display unit 300 of the embodiments illustrated at FIGS. 1-*a* and 1-*b* is preferably a digital display unit such as an LCD panel or HDTV.

When A/V content data is received, it will typically be preceded by an identifier indicating the type or format of the content (i.e. audio, visual or both) and may also incorporate additional metadata including recording image processing modifications performed on the remote control unit 200. Image processing may alternatively or additionally be performed by the processor 320 on the receiver 310. The receiver-side image processing may be responsive to metadata associated with the A/V content data. As an example, a user may program a slideshow sequence on the remote control unit 200 and then transmit the resulting A/V data to the receiver 310. Further image processing, including transition effects, redeye removal, blemish removal such as from dust, and/or motion blur compensation can be performed in the receiver 310 prior to the actual rendering of the slideshow image sequence on a TV or other display unit 300. Such image processing may also be managed directly from the remote control unit 200. Thus, the receiver 310 may directly control the display unit 300 to play (in the case of audio or movies) and/or display (in the case of still images) the A/V content data.

Alternatively, remote control unit 200 may control the unit 300 indirectly via the receiver. Such control may include the transition between objects, editing the object, selecting which objects to display, and/or erasing and reordering objects. Editing objects may include operations such as color correction, red eye reduction, rotation, exposure correction, and cropping.

Another embodiment is illustrated at FIG. 2. In this embodiment, the remote control unit 200 is preferably the same as or similar to that described in the FIGS. 1-*a* through 1-*c*. In this case, however, the wireless receiver 410 is connected to a digital camera 400 or similar imaging appliance. An advantage of this alternative embodiment is that a digital camera will, typically, incorporate a display subsystem 460 which allows it to be connected to a conventional audiovisual CE appliance such as a TV set 300. Furthermore, the latest digital cameras incorporate WLAN or Bluetooth subsystems. Accordingly, a digital camera with such wireless communications and display subsystems can be modified to take advantage of the remote control unit 200 with removable storage reader 210. In other words, in this embodiment the receiver 410 controls the display unit 300 to play and/or display the A/V content data via digital camera 400.

Figure 3:
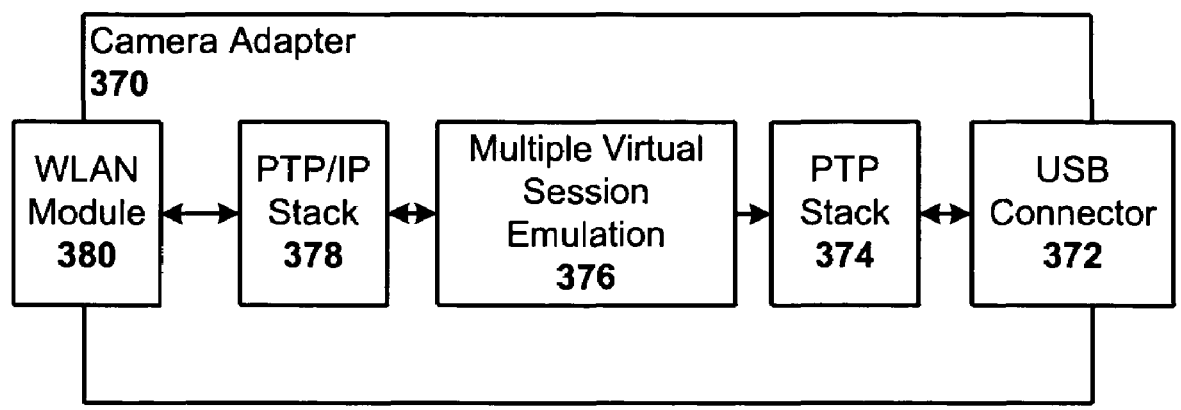
FIG. 3 is a block diagram of a camera adaptor unit.

In a practical exemplary implementation of this alternative embodiment, the camera is a PTP-enabled digital camera, such as may be described at (i) "Digital camera connectivity solutions using the picture transfer protocol (PTP)" to Bigioi, P.; Susanu, G.; Corcoran, P.; Mocanu, I and published in IEEE Transactions on Consumer Electronics, volume 48, issue 3, p 417-427, August 2002; or (ii) PTP/ISO-15740 PTP Specification, available from http://www.i3a.org/downloads_$it$ 10.html, which are hereby incorporated by reference. The camera 400 is preferably connected to an adapter unit 370 such as that illustrated in block form at FIG. 3. The adapter unit 370 of FIG. 3 may correspond generally to wireless communication chip 440 of FIG. 2. The camera adapter unit 370 incorporates a USB connection 372, which allows a PTP-enabled digital camera to be connected to the adapter system. It further provides a PTP stack 374, which provides access to the PTP functionality of the digital camera. The adapter also incorporates a WLAN interface module 380, which provides connectivity to an external wireless network. This module 370 may be replaced by Infrared, Bluetooth or Powerline communications modules. Implicitly contained within the WLAN communications module is a TCP/IP stack (or a Bluetooth, Infrared or Powerline stacks as appropriate to the physical communication chip be used).

A PTP/IP stack 378 is also incorporated in the main adapter, thus providing remote access to the PTP functionality of the camera. One further software module is preferably used to fully enable wide-area networking support for remote access to the PTP-enabled digital camera. This is a multiple virtual session emulation module 376. This module 376 is preferably used because the PTP protocol that is designed to support point-to-point communications between a camera and a desktop computer typically does not support the concept of multiple connected devices or multiple concurrent device sessions. Support for these concepts is embodied in the PTP/IP protocol, but this also requires some OS-level support from the device within which the PTP/IP stack is implemented. Thus, as the PTP/IP stack is not directly implemented within the generic PTP camera, it is necessary to provide some emulation support for device and session IDs within the adapter itself. Wireless receivers 310, 410 have been shown as separate components in the illustrative embodiments. However, they could be incorporated into the display unit 300 or digital camera 400.

Figure 4:
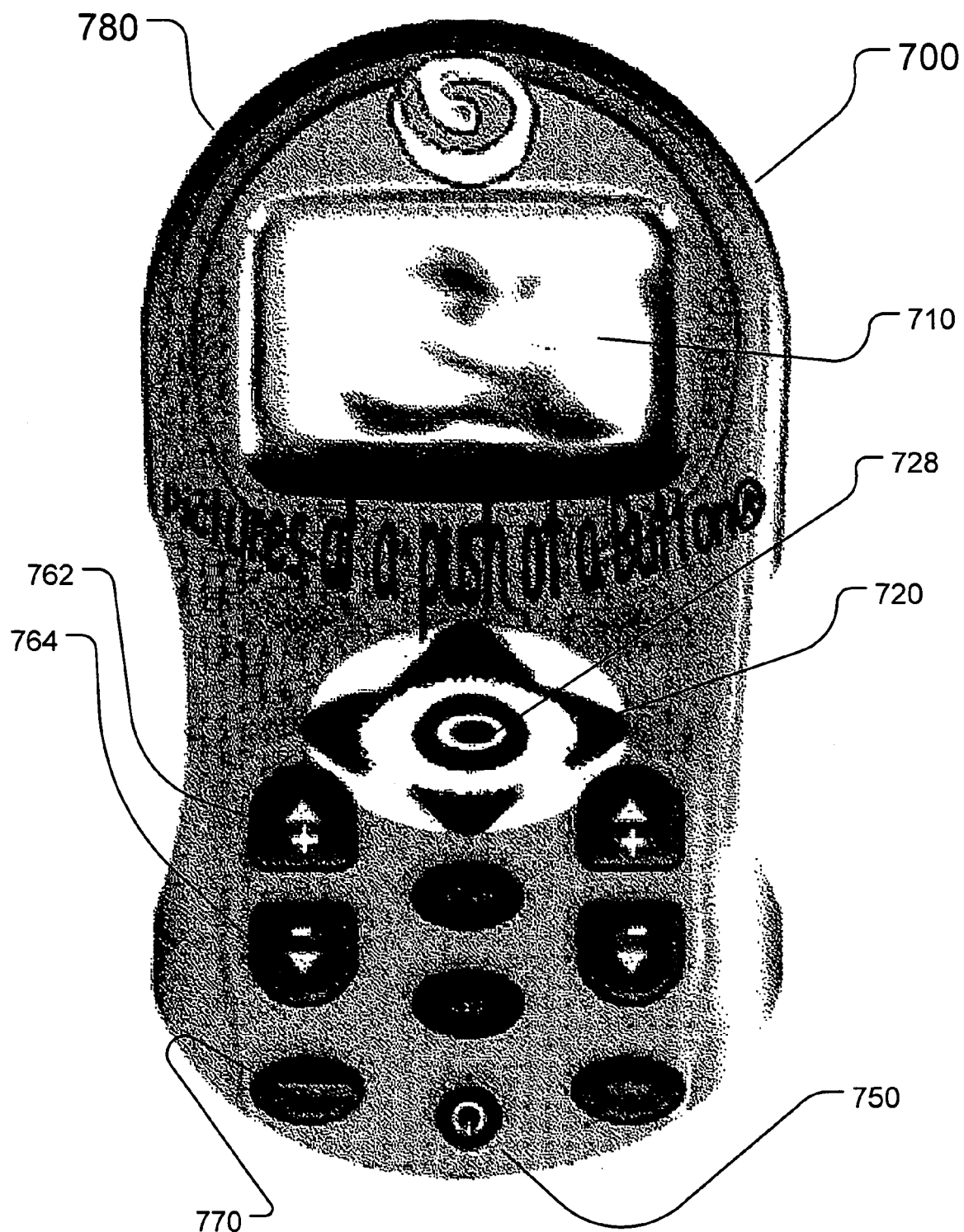
FIG. 4 is a perspective view of an embodiment of a remote control handset.

FIG. 4 illustrates a physical implementation of a remote control unit 700 corresponding to the unit 200 shown in the block diagrams of FIGS. 1-*a*, 1-*b*, 1-*c* and 2. The remote control unit 700, which may be similar in form and function to conventional known remote control units, preferably exhibits some additional features designed to accommodate the principle elements of the embodiments described herein.

First, it may incorporate a slot 780 in the casing of the remote control unit to accommodate the insertion and removal of a removable storage medium into the reader 210 (see FIG. 1-*a*). Alternatively, slot 780 may be a USB master plug 212 (see, e.g., FIG. 1-*b*) which will accept a USB cable from the camera 100. In addition, it may incorporates special function keys 770 to initiate customized image processing algorithms which can enhance or improve the digital content that may be accessed and further managed, manipulated, combined or otherwise processed on the remote control unit 700.

In addition to automated image processing functions, the remote control unit 200, 700 may optionally incorporate a graphical LCD display 710 which can display images loaded from the removable storage medium subsystem 210. This allows for additional image processing and enhancement functions to be performed on the remote control unit 700 where user input from the remote control keys 762, 764 may be used to adjust a parametric input to the image processing and functions such as brightness or exposure.

Further advanced functionality can be achieved using more complex user input such as may be obtained from an "arrow-key" input button 720 which can allow accurate panning, zooming and scrolling of a selected image. An OK/Enter button is indicated at 728 and an ON/OFF button is indicated at 750 of FIG. 4.

Figure 5:
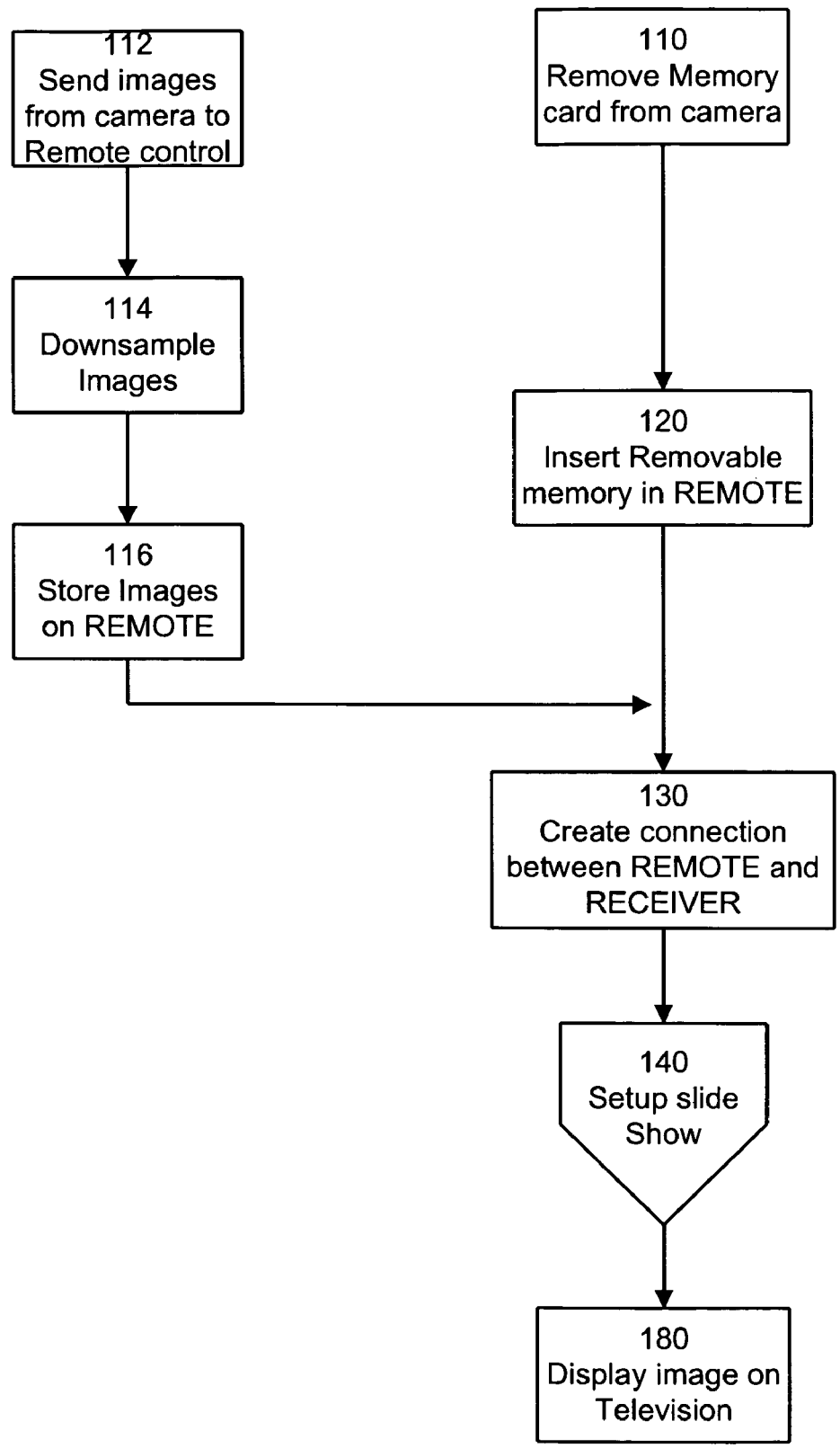
FIG. 5 is workflow diagram illustrating operation of a system in accordance with a preferred embodiment, including two alternative sources of digital images.

An exemplary workflow is illustrated in FIG. 5 for the transmission of, in this example, still images. At block 110, a memory card is removed from a digital camera or similar imaging device, and then inserted into the card reader of the remote control unit at block 120. A communications link is then automatically or manually activated between the remote control unit 200, 700 and the wireless receiver at block 130. According to this embodiment, the receiver may be an adapter connected to a standard TV set, or alternatively an adapter connected to a digital camera with a display output suitable for providing a signal to a TV set. As stated, these adapter units may be incorporated internally within the TV set or digital camera, rather than being separate appliances.

Alternatively, the functions illustrated at block 130 may be operated on an intermediate device such as a centralized remote control box, a digital camera or a home server that will indirectly control the receiver.

After the communications channel between the remote control unit and the receiver is established, the user may next initiate a sequence of image transfers between the remote control unit and the receiver at block 140. These transfers may be a sequential display of all the images stored on a memory card, or may alternatively be sequenced by the user, or randomly sequenced. The system may optionally provide support for an interactive user interface (UI) wherein the remote control unit enables a video overlay subsystem within the host device to be activated. The user may then navigate the displayed overlay UI using the remote control keys and thus achieve a more advanced control over the sequencing and transitions for a slide-show display of the images. Finally, at block 180, the images are displayed on the television set.

FIG. 5 also illustrates an alternative embodiment of the system work-flow wherein the images are received wirelessly (not shown) or via a tethered communication (see FIG. 1-*b*) from a digital camera at block 112. Image processing (e.g. downsampling) at block 114 and local storage at block 116 functions are performed by the remote control unit prior to initiating the communications link at block 130, and subsequently transmitting a slideshow of the images at block 140 for display on a user's TV set at block 180. The example of FIG. 5 may be applied to video and/or audio data, as well, and it may be applied to output at a printer (see FIG. 1-*c*).

ALTERNATIVE EMBODIMENTS

The following publications, as well as other publications cited above and below herein, and the background, invention summary, brief description of the drawings and abstract, are hereby incorporated by reference as disclosing alternative embodiments or features not otherwise described in detail above:

[PTP] PTP/ISO-15740, "Picture Transfer Protocol Specification", http://www.i3a.org/downloads_it10.html;

[USB] USB Device Working Group, "USB Still Image Capture Device Definition", http://www.usb.org/developers/devclass_docs/usb_still_img10.pdf;

[CIPA] CIPA, "CIPA DC-001-2003 Digital Photo Solutions for Imaging Devices", http://www.cipa.jp/pictbridge/contents_e/03overview_e.html;

[PB] P. Bigioi, G. Susanu, P. Corcoran and I. Mocanu, "Digital Camera Connectivity Solutions using the Picture Transfer Protocol (PTP)", *ICCE* 2002 and *IEEE Transactions on Consumer Electronics*, vol. 48, number 3, pp. 417-427, August 2002;

[PTP-IP] PTP/IP Draft Specification—for review purposes only www.fotonation.com/products;

[UPNP] UPNP Forum http://ww.upnp.org;

[MTP]; see Media Transfer Protocol Specification msdn.microsoft.com/library/default.asp?url=/library/en-us/dn-wmt/html/mtp_spec.asp.;

The A/V acquisition device 100 that the remote control unit 210 communicates with, in accordance with preferred and alternative embodiments herein, may include an industry accepted (whether as de-facto or de-juro) standard Application Interface Protocol ("API"), or Command Language, that describes the means of retrieving data from the acquisition device. Examples of such interfaces include ISO-15740, aka "Picture-Transfer-Protocol" or "PTP", which describes a command language between digital cameras and receiving devices; see PTP/ISO-15740, "Picture Transfer Protocol Specification", www.i3a.org/downloads_it10.html.

Such command languages may also have a transport layer component which can be tethered or IP based such as USB Still Image Device Class definition which correlates to the implementation of PTP over USB; see USB Device Working Group, "USB Still Image Capture Device Definition", www.usb.org/developers/devclass_docs/usb_still_img10.pdf or PTP over IP ("PTP-IP") which correlates to the implementation of PTP over Internet Protocols; see PTP/IP Draft Specification—www.fotonation.com/products.

There may be a specified protocol on top of the PTP for output of images. One example is PictBridge (see, "CIPA DC-001-2003 Digital Photo Solutions for Imaging Devices", http://www.cipa.jp/pictbridge/contents_e/03overview_e.html for specification) which describes such output protocol that may be used in an embodiments for printing purposes.

Another protocol is the Universal Plug-and-Play Orienting protocol [uPNP]. In generic multi media device cases, such protocol may be Multi Media Transfer Protocol ("MTP").

The present invention is not limited to the embodiments described above herein, which may be amended or modified without departing from the scope of the present invention as set forth in the appended claims, and structural and functional equivalents thereof. In addition, in methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

What is claimed is:

1. An apparatus for the remote wireless control of a consumer electronic (CE) appliance, comprising a remote control handset that is configured to directly or indirectly control the CE appliance for playing, displaying, transitioning or editing audio or visual data, or both (hereinafter "A/V" data), or combinations thereof, including a push-button image processing interface including multiple push-buttons configured to be depressable by one or more fingers or a thumb or both of a same hand within which the remote control handset is being held by a user, and a second interface for receiving the A/V data from an A/V device; and a wireless receiver coupled to the CE appliance, wherein the interface of the remote control handset comprises a display unit, and one or more of a reader for a removable storage medium for A/V data, or a cable or wireless communications interface to the A/V device for receiving the A/V data, such that A/V data transmitted to the receiver is respectively read from the storage medium by the reader or is read from the A/V device via the cable or wireless communications interface, or combinations thereof;

wherein the remote control unit is configured for processing A/V data prior to transmission to the wireless receiver, or the wireless receiver is configured for processing the A/V data prior to playing or displaying the data, or both, on the CE appliance, or both;

wherein the remote control unit is configured to transmit the A/V data and control codes wirelessly to the receiver, and wherein the receiver is configured to be responsive to the A/V data and control codes from the remote control handset, and to process the A/V data responsive to metadata associated with the A/V data, and to control the CE appliance to output the A/V data, and wherein the wireless receiver processes the A/V data, including dust or other blemish removal, motion blur compensation, transition effects, color correction, exposure correction, red eye reduction, rotating, panning, scrolling or cropping, or editing an object, selecting which objects to display, or erasing and reordering objects, or combinations thereof, under the push-button control of the remote control handset for providing a processed image or processed A/V data, or both, to be output at the CE appliance based on the processed image data.

2. The apparatus as claimed in claim 1, wherein the remote control handset is further configured to directly control the CE appliance.

3. The apparatus as claimed in claim 1, wherein the remote control handset is configured to indirectly control the CE appliance through the receiver.

4. The apparatus as claimed in claim 1, wherein the interface of the remote control handset comprises a reader for a removable storage medium for A/V data, such that A/V data transmitted to the receiver is read from the storage medium by the reader.

5. The apparatus as in claim 1, wherein said remote control handset further comprises an internal storage for storing A/V data.

6. The apparatus as claimed in claim 1, wherein the interface of the remote control handset comprises a cable or wireless communication interface to the A/V device for receiving the A/V data, such that said A/V data transmitted to the receiver is read from the A/V device.

7. The apparatus as claimed in claim 6, wherein the interface comprises a wireless interface and the A/V data is wirelessly readable from the A/V device.

8. The apparatus as in claim 6, wherein said A/V data is read from a storage medium on said A/V device.

9. The apparatus as in claim 8, wherein said remote control handset comprises internal storage, wherein A/V data is saved on said internal storage.

10. The apparatus as claimed in claim 8, wherein said interface is configured according to Picture Transfer Protocol ("PTP").

11. The apparatus as cited in claim 10, wherein the underlying transport layer for said interface comprises USB Still Imaging Device Class over PTP.

12. The apparatus as claimed in claim 6, wherein the A/V device comprises a digital stills camera.

13. The apparatus as claimed in claim 6, wherein the A/V device comprises a digital video camera.

14. The apparatus as claimed in claim 6, wherein the A/V device comprises a digital audio player.

15. The apparatus as claimed in claim 1, wherein the consumer electronic appliance comprises a display unit.

16. Aft The apparatus as claimed in claim 15, wherein the display unit comprises a television set.

17. The apparatus as claimed in claim 1, wherein the a display unit is controlled directly by the wireless receiver.

18. The apparatus as claimed in claim 1, wherein the receiver is configured to directly control the CE appliance.

19. The apparatus as claimed in claim 1, wherein the receiver is connectable to a further electronic appliance and controls the CE appliance to play or display A/V data, or both, via the further electronic appliance.

20. The apparatus as claimed in claim 19, wherein the further electronic appliance comprises a digital camera.

21. The apparatus as claimed in claim 19, wherein the further electronic appliance comprises a home server appliance.

22. The apparatus as claimed in claim 19, wherein the further electronic appliance comprises a centralized remote control unit.

23. The apparatus as claimed in claim 19, wherein the further electronic appliance comprises a docking station.

24. The apparatus as claimed in claim 1, wherein the wireless receiver is incorporated in the CE appliance.

25. The apparatus as claimed in claim 19, wherein the wireless receiver is incorporated in the further electronic appliance.

26. The apparatus as claimed in claim 1, wherein the remote control unit is configured for processing A/V data prior to transmission to the wireless receiver.

27. The apparatus as claimed in claim 1, wherein the wireless receiver is configured for processing the A/V data prior to playing or displaying the data, or both, on the CE appliance.

28. A method for the remote wireless control of a consumer electronic (CE) appliance, comprising receiving audio or visual data, or both (hereinafter "A/V" data) from an A/V device at an interface of a remote control handset, wherein the interface of the remote control handset comprises a display unit, and one or more of a reader for a removable storage medium for A/V data, or a cable or wireless communications interface to the A/V device for receiving the A/V data, such that A/V data transmitted to the receiver is respectively read from the storage medium by the reader or is read from the A/V device via the cable or wireless communications interface, or combinations thereof;

processing A/V data prior to transmission to a wireless receiver, or controlling processing of the A/V data prior to playing or displaying the data, or both, at the CE appliance;

transmitting the A/V data and control codes to a receiver, wherein the receiver is configured to be responsive to the A/V data and control codes from the remote control handset to control the CE appliance to output the A/V data, including directly or indirectly controlling the CE appliance for playing, displaying, transitioning or editing the A/V data, or combinations thereof;

performing A/V data processing at the wireless receiver in response to metadata associated with the A/V data, wherein the processing at the wireless receiver includes dust or other blemish removal, motion blur compensation, transition effects, color correction, exposure correction, red eye reduction, rotating, panning, scrolling or cropping, or editing an object, selecting which objects to display, or erasing and reordering objects, or combinations thereof;

controlling the A/V data processing with the remote control handset including holding the remote control handset in a single hand of a user and, using a push-button image processing interface including multiple push-buttons of the remote control handset, selectably depressing the buttons with one or more fingers or a thumb or both of the same hand within which the remote control handset is being held by the user; and outputting processed A/V data or a processed image, or both, based on the A/V data processing.

29. The method as in claim 28, further comprising directly controlling the CE appliance.

30. The method as in claim 28, further comprising indirectly controlling the CE appliance through the receiver.

31. The method as in claim 30, wherein said controlling indirectly through the receiver comprises controlling the receiver to control the CE appliance for playing, displaying, transitioning or editing said A/V data, or combinations thereof.

32. The method as in claim 28, further comprising receiving at said interface a removable storage medium having A/V data stored thereon, and reading the A/V data for transmitting to the receiver.

33. The method as in claim 28, further comprising storing A/V data at an internal storage.

34. The method as in claim 28, further comprising interfacing with the acquisition device via a cable or wireless communication interface for receiving the data for transmitting to the receiver.

35. The method as in claim 28, further comprising configuring said interface according to Picture Transfer Protocol ("PTP").

36. The method as in claim 35, further comprising further configuring said interface according to USB Still Imaging Device Class over PTP.

37. The method as in claim 28, wherein the A/V device comprises a digital stills camera.

38. The method as in claim 28, wherein the A/V device comprises a digital video camera.

39. The method as in claim 28, wherein the A/V device comprises a digital audio player.

40. The method as in claim 28, further comprising processing A/V data prior to transmitting to the receiver.

41. One or more processor readable storage devices having processor readable code embodied thereon, said processor readable code for programming one or more processors to perform the steps of:
receiving audio or visual data, or both (hereinafter "A/V" data) from an A/V device at an interface of a remote control handset, wherein the interface of the remote control handset comprises a display unit, and one or more of a reader for a removable storage medium for A/V data, or a cable or wireless communications interface to the A/V device for receiving the A/V data, such that A/V data transmitted to the receiver is respectively read from the storage medium by the reader or is read from the A/V device via the cable or wireless communications interface, or combinations thereof;
processing A/V data prior to transmission to a wireless receiver, or controlling processing of the A/V data prior to playing or displaying the data, or both, at the CE appliance;
transmitting the A/V data and control codes wirelessly to a receiver, wherein the receiver is configured to be responsive to the A/V data and control codes from the remote control handset to control the CE appliance to output the A/V data, including directly or indirectly controlling the CE appliance for playing, displaying, transitioning or editing the A/V data, or combinations thereof;
performing A/V data processing at the wireless receiver in response to metadata associated with the A/V data, wherein the processing at the wireless receiver includes dust or other blemish removal, motion blur compensation, transition effects, color correction, exposure correction, red eye reduction, rotating, panning, scrolling or cropping, or editing an object, selecting which objects to display, or erasing and reordering objects, or combinations thereof;
controlling the A/V data processing with the remote control handset including holding the remote control handset in a single hand of a user and, using a push-button image processing interface including multiple push-buttons of the remote control handset, selectably depressing the buttons with one or more fingers or a thumb or both of the same hand within which the remote control handset is being held by the user; and
outputting processed A/V data or a processed image, or both, based on the A/V data processing.

42. The one or more storage devices of claim 41, further comprising a program for directly controlling the CE appliance.

43. The one or more storage devices of claim 41, further comprising a program for indirectly controlling the CE appliance through the receiver.

44. The one or more storage devices of claim 43, wherein said controlling indirectly through the receiver comprises controlling the receiver to control the CE appliance for playing, displaying, transitioning or editing said A/V data, or combinations thereof.

45. The one or more storage devices of claim 41, further comprising a program for reading the A/V data for transmitting to the receiver.

46. The one or more storage devices of claim 41, further comprising an internal storage for storing printer data.

47. The one or more storage devices of claim 41, further comprising an interface for interfacing with the acquisition device via a cable or wireless communication interface for receiving the data for transmitting to the receiver.

48. The one or more storage devices of claim 41, further comprising a program for configuring said interface according to Picture Transfer Protocol ("PTP").

49. The one or more storage devices of claim 48, further comprising a program for further configuring said interface according to USB Still Imaging Device Class over PTP.

50. The one or more storage devices of claim 41, wherein the A/V device comprises a digital camera.

51. The one or more storage devices of claim 41, wherein the A/V device comprises a digital video camera.

52. The one or more storage devices of claim 41, wherein the A/V device comprises a digital audio player.

53. The one or more storage devices of claim 41, further comprising a program for processing A/V data prior to transmitting to the receiver.

54. An apparatus for the remote wireless control of internet uploading, comprising
a remote control handset that is configured to directly or indirectly control the CE appliance for playing, displaying, transitioning or editing audio or visual data, or both (hereinafter "A/V" data), or combinations thereof, including a push-button image processing interface including multiple push-buttons configured to be depressable by one or more fingers or a thumb or both of a same hand within which the remote control handset is being held by a user, and a second interface for receiving internet content from an A/V device; and
a wireless receiver coupled to an internet upload device for uploading content to be accessible on the internet,
wherein the interface of the remote control handset comprises a display unit, and one or more of a reader for a removable storage medium for A/V data, or a cable or wireless communications interface to the A/V device for receiving the A/V data, such that A/V data transmitted to the receiver is respectively read from the storage medium by the reader or is read from the A/V device via the cable or wireless communications interface, or combinations thereof;
wherein the remote control unit is configured for processing A/V data, or the wireless receiver is configured for processing the A/V data, or both, prior to uploading content to be accessible on the internet;

wherein the remote control handset is configured to transmit the A/V data and control codes wirelessly to the receiver, and wherein the receiver is configured to be responsive to the internet content and control codes from the remote control handset, and to process the A/V data responsive to metadata associated with the A/V data, and to control the internet uploading of the content, and wherein the wireless receiver processes the A/V data, including dust or other blemish removal, motion blur compensation, transition effects, color correction, exposure correction, red eye reduction, rotating, panning, scrolling or cropping, or editing an object, selecting which objects to display, or erasing and reordering objects, or combinations thereof, under the push-button control of the remote control handset for providing a processed image or processed A/V data, or both, to be output at the CE appliance based on the processed image data.

55. The apparatus as claimed in claim 54, wherein the remote control handset is further configured to directly control the internet upload device.

56. The apparatus as claimed in claim 54, wherein the remote control handset is configured to indirectly control the internet upload device through the receiver.

57. The apparatus as claimed in claim 54, wherein the interface of the remote control handset comprises a reader for a removable storage medium for internet content, such that internet content transmitted to the receiver is read from the storage medium by the reader.

58. The apparatus as claimed in claim 54, wherein the interface of the remote control handset comprises a cable or wireless communication interface to the A/V device for receiving the internet content, such that said internet content transmitted to the receiver is read from the A/V device.

59. The apparatus as claimed in claim 54, wherein the A/V device comprises a digital stills camera.

60. The apparatus as claimed in claim 54, wherein the A/V device comprises a digital video camera.

61. The apparatus as claimed in claim 54, wherein the A/V device comprises a digital audio player.

62. The apparatus as claimed in claim 54, wherein the receiver is connectable to a further electronic appliance and controls the internet upload device via the further electronic appliance.

63. The apparatus as claimed in claim 62, wherein the further electronic appliance comprises a digital camera.

64. The apparatus as claimed in claim 62, wherein the further electronic appliance comprises a home server appliance.

65. The apparatus as claimed in claim 62, wherein the further electronic appliance comprises a centralized remote control unit.

66. The apparatus as claimed in claim 62, wherein the further electronic appliance comprises a docking station.

67. The apparatus as claimed in claim 62, wherein the wireless receiver is incorporated in the further electronic appliance.

68. The apparatus as claimed in claim 54, wherein the remote control unit is configured for processing internet content prior to transmission to the wireless receiver.

69. The apparatus as claimed in claim 54, wherein the wireless receiver is configured for processing the internet content prior to internet uploading.

* * * * *